Sept. 12, 1933.  C. L. BROWNE  1,926,139
EDUCATIONAL DOLL APPARATUS
Filed July 30, 1928  2 Sheets-Sheet 1
Fig.2.
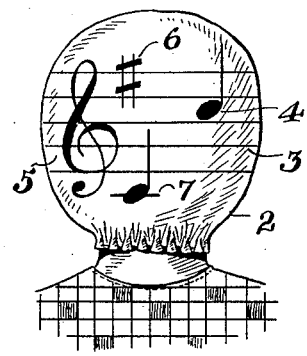
Fig.1.
Fig.3.
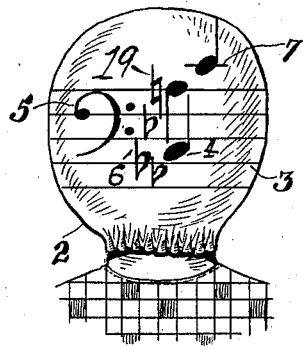
Fig.4.
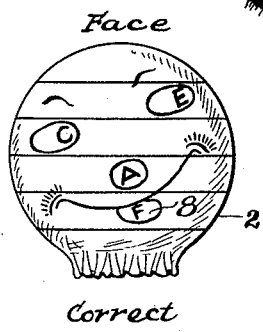
Correct
Fig.5.
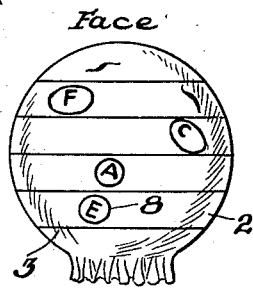
Wrong
Inventor
Carmen L. Browne
By Fredk Transom
Attorney Sept. 12, 1933.     C. L. BROWNE     1,926,139
EDUCATIONAL DOLL APPARATUS
Filed July 30, 1928     2 Sheets-Sheet 2

Lunch Time

School's Out

Inventor
Carmen L. Browne

By Fred'k Transom
Attorney

// Patented Sept. 12, 1933

UNITED STATES PATENT OFFICE 1,926,139

EDUCATIONAL DOLL APPARATUS

Carmen L. Browne, New York, N. Y.

Application July 30, 1928. Serial No. 296,285

3 Claims. (Cl. 35—12)

My invention relates to a doll and a system of education used therewith designed to facilitate the instruction of children in behavior and deportment, as well as educate them in the rudiments of any branch of learning; for instance, arithmetic, music, languages, etc.

One object of the invention is to associate with a doll educational matter which is commonly presented in unattractive, formal lessons.

Another object is to combine instructive, or symbolic information with the design of an ordinary doll, without considerably changing its make-up as an ordinary doll.

Another object is to provide a progressively graded course of instruction in any subject of learning, suitable for a child's comprehension, used with either a single doll or a plurality of dolls.

Another object is to provide a manikin that may be cheaply and quickly changed to exhibit artistically new ideas, for advertising and display purposes, such as window dressing etc.

Other objects and advantages will appear from the following description of the invention and drawings.

Figure 1 shows a child holding a doll exemplifying the use of my invention;

Figure 2 shows a front elevation of the head of a doll inscribed with musical characters.

Figure 3 is a front elevation of the head of a doll inscribed with other musical characters.

Figure 4 shows a front elevation of a doll's head, provided with a diagram used in musical instruction.

Figure 5 is a front elevation of a doll's head with a different musical diagram.

Figure 6:
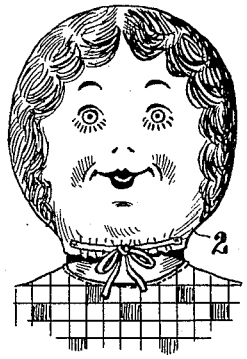
Figures 6 and 7 are front and rear elevations, respectively of a doll's head, designed to give lessons in deportment.
Figure 7:
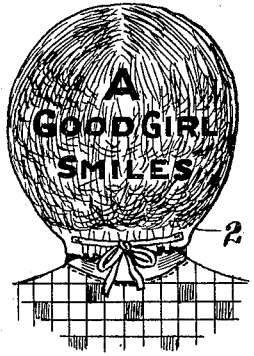

My invention pertains to a field of education in which young children are assisted in acquiring knowledge of different subjects by utilizing the well known psychological principle that a student more readily assimilates information in a strange subject if it is presented in connection with things the student already understands and in which he takes an interest. This feature of the invention may be illustrated by referring to the strong natural interest a little girl shows in fondling and caring for a doll, or in playing at "keeping house" etc. By carefully extending such interests to include desirable, useful information in elementary subjects it is found a child learns easily and well many things which could only be acquired with great effort and application if formally taught.

The invention also has commercial and artistic applications in directing attention to new styles, and exhibiting correct apparel for certain uses, histrionic, dramatic etc.

Furthermore, by extension of such a system of instruction into a series of progressively difficult lessons, the hold on a child's attention is maintained until it knows enough about a subject to make its further progress therein satisfactory by formal lessons, based on the principles and reasons that govern the development of the subject.

More particularly stated, my invention relates to a doll, puppet or manikin, with removable and interchangeable hoods to cover its head. The hoods are made up so that facial and head, i. e., physiognomic characteristics are recognizable; furthermore, the original head and face characteristics of the doll, for instance, together with educational marks, characters or symbols, all arranged and designed to depict, and impress the rudiments of any branch of learning on a child's mind, may be indefinitely varied throughout by the series of hoods, used either in a single lesson, or in a series of lessons. The invention also finds application in representations of the quasi-instructional matter commonly associated with exhibit forms used for advertising and display purposes, greatly lessening the first cost and duplication of this class of apparatus. This indefinite variation is also utilized to attract attention and impart information of goods etc. or to give intelligence when the series of hoods is used as an adjunct of advertising apparatus.

The hoods may be stamped, marked or printed on their inside and outside faces, or on either of these faces, thus giving the maximum surface possible for delineation of instructional matter, and for effecting variations in this matter. Where possible the relative location and distribution of the instructive matter should accord with physiognomic features, and be so chosen that physiognomic proportions are maintained. In some instances it may be even possible to follow these rules and work out an attractive design or picture which will serve to catch a child's attention.

A doll having a head provided with such a series of marked, printed, or decorated hoods can be usefully employed simply as a plaything, exhibit, or display device, for the purposes mentioned but I have found its widest and most useful application to be had in a regular plan of instruction in which the doll is used as an auxiliary to a book with textual instructive matter, or where the teacher is well qualified in a subject simply as an aid in conveying the meaning of oral instruction. According to the special application in view the general design and selection and arrangement of characters in combination with physiognomic features must be varied and adapted to the end in view.

While I have found such a plan of instruction gives excellent results in several different subjects, it has been particularly successful in teaching musical notation, either to the individual child, or in class work.

In any branch of learning before the subject can be approached from the standpoint of principles and reasons there is a fund, or basis, of universally accepted knowledge about the subject which a student must be put in possession of before any effective work can be done by himself. This is particularly true in music, the scales and chords and progressions have all been well established, either by the instructions and discoveries of gifted musicians or well reasoned researches of scientists.

In all classes of musical instruction much time is wasted at present, because students have an imperfect knowledge of musical notation, which is really a language in itself. Instead of acquiring this knowledge as part of the practice period it can be learned perfectly and easily by rote exercises conducted as part of a child's playtime activities. Such knowledge, acquired while engrossed in things the child takes a strong natural interest in is never forgotten and its application to the higher branches of the subject is immediately understood in the course of progress therein. If, on the contrary, a child is forced to give its attention to a subject it is unable to understand, and in which it takes no natural interest, what is learned is soon forgotten, and besides a dislike developes for the subject which wholly bars progress. A more serious objection to forced study is that it quickly impairs the health of young children.

Referring to the drawings Figure 1 shows a child with a doll which closely resembles an ordinary rag doll, the principal difference being the head is formed of somewhat greater diameter to give a face exposure sufficient to serve as a black-board, chart or tablet on which any kind of instructional characters can be inscribed, either temporarily or permanently.

As a child is constantly looking at a doll's face it will be apparent that these characters will be always in view and noticed. If possible the characters should be grouped to resemble the features of a human face as shown in Figure 1, in which the two eyes are numbered 1 and 2 respectively and the nose 3, the mouth 4. As shown in the other figures of the drawings this grouping can be extended and varied.

Figure 2 shows the application of my invention to the teaching of musical notation. The face of the doll in Figure 2 shows a portion of the treble staff with clef and signature sign and an indication of a quarter note (c) as written on a leger line, below the staff and also in a space of the staff. All this information can be developed by a qualified teacher while the child plays with the doll and several children together can be instructed in a way in which is little more than a pleasant drill.

For the guidance of teachers I find an illustrated book of rhymes carefully composed to tell the meaning of the characters on the doll's face to be of great assistance. The teacher knowing the whole subject intimately will at once see the connection of the several dolls to what is to be taught. When the children have become proficient in the exercise shown on one doll's head another doll with a different set of characters can be taken up, but preferably the same doll can be used throughout, and its range of instruction extended by slipping a different face suitably inscribed with a new lesson over the old face.

This will be understood from Figures 2 and 3 by observing that the face shown in Figure 2 is in the treble and the one shown in Figure 3 is the bass clef. Considering Figures 2 and 3 as a series, the teacher can explain in simple language that the note marked 7 on Figure 2 is middle c and that it is one leger line below the staff lines. Also that this same note middle c, is shown at 7 in Figure 3, where it is one leger line above the staff lines. These explanations can be varied infinitely, according to the experience and initiative of the teacher, but it is best to keep repeating the same simple explanations, so that the child has the lesson stamped indelibly on its mind, visually and orally.

Following such instructions a teacher, picking up a doll with a face marked as in Figure 4, will ask the child to spell musically a simple word, for instance —face—, using the space notes of the treble clef. This exercise will, of course, only be given after many more elementary lessons have been learned. The Figure 4 face on a doll held in the child's arms will at the same time be used to help it spell out the space letters or notes, beginning at 8 (Figure 4) and reading up. The Figure 5 face can be used to impress on the child that if the space notes are not correctly named they will not spell —face— beginning at 8 (Figure 5) and reading upwardly.

The group of masks or false faces, shown in Figures 6 to 9 can be used by a teacher to make a child realize when it is behaving properly and how important it is to its welfare to keep in a happy, pleasant frame of mind. The difference between a child so disposed, and one that is disagreeable is made plain by the two types of facial expressions and the corresponding mottoes written on the backs of the heads.

Figures 10 to 13 can be used to inculcate graceful and attractive deportment and to give lessons corrective of physical handicaps and improved physical culture generally. A single glance at the difference between the right and wrong way of conducting itself will often be sufficient to cure troublesome faults in a child.

As noted, the doll of special design, described above, is best used in conjunction with the system of instruction carefully worked out in a book by someone very conversant with the subject to be taught and containing rhymes and short recital stories suitable for a child's comprehension explanatory of the material inscribed on the doll's face. The contents of this book will be largely only suggestive to a competent teacher who will be able to vary and extend the detailed instruction and to connect the dependence of one doll on another in developing any given subject, also to correlate the use of several different faces on a single doll as a pupil's knowledge of the subject increases.

Figure 8:
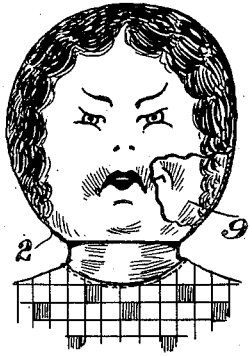
Figures 8 and 9 are front and rear elevations, respectively of a doll's head used in giving lessons in behavior.
Figure 9:
Figure 10:
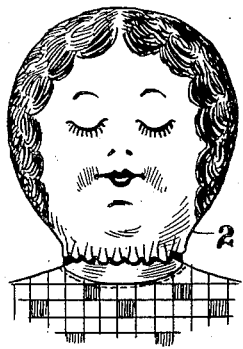
Figures 10, 11, 12 and 13 show front and rear elevations of heads useful in character instruction.
Figure 11:
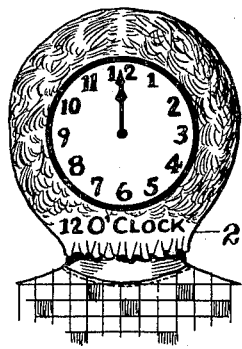
Figure 12:
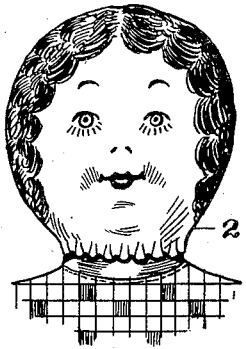
Figure 13:
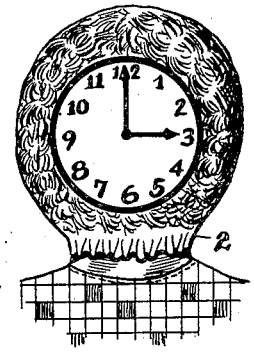

I have indicated several different ways in which the different hoods may be affixed to the doll's head, a running string (Figure 2), front and back tie ribbons (Figure 6) and Figure 8 the use of a rubber, or other distensible material hood which will fit the head closely and be practically imperceptible as a covering. A series of these hoods may be applied, one after the other, two are shown in place in Figure 8, in which the numeral 9 indicates one face which is wholly covered by an outer face except at the place broken away for illustration.

The different dolls may be grouped in any given arrangement for instructional purposes, for instance one of them may be dressed to resemble the conductor of an orchestra and be given a title or name such as "Do-do-man" and the rhymes and recital of pieces can be worked up around his supposed personality to amuse and interest the children while they are receiving instruction.

I have shown and described a child's doll as the preferable medium for imparting instruction in my improved system, but any other plaything such as a teddy bear, rabbit or any kind of puppet can be used instead, the instructional characters being inscribed preferably on the head portions.

While, as explained above, the invention can be practiced by using a series of dolls, each separate and complete in itself, the expedient of providing a number of detachable and interchangeable hoods to extend and vary a lesson, or lessons, begun on the integral face of the doll itself, greatly economizes space, both in use and in packing. A single doll and an extra dozen hoods therefor can be neatly packed in with a book of instruction, designed to be used in conjunction with the doll, and as a corollary thereto. Obviously, however, for special purposes, the invention might be practiced by using a plurality of dolls, some or all of which can be provided with a plurality of the hoods, to supplement the inscriptions marked on their integral faces.

What I claim is:

1. A distensible hood, shaped to resemble a human head, and provided with distinctive instructional characteristics incorporated therewith, for the purpose of conveying information when applied to a lay figure of a human head.

2. A removable head covering made of distensible rubber and comprising a face portion adapted to be supported by the face of a wearer, and a portion representing hair adapted to be supported over the hair portion of a wearer when put on a head of human outline.

3. A removable head covering made of distensible material having markings thereon representing hair and adapted to be slipped over a head of human contour, presenting when distended thereon a portion which simulates in shape and appearance a natural head of hair.

CARMEN L. BROWNE.